US009646492B2

(12) United States Patent
Koshizen

(10) Patent No.: US 9,646,492 B2
(45) Date of Patent: May 9, 2017

(54) CONGESTION SIGN DETECTION METHOD, PROGRAM, AND CONGESTION SIGN DETECTION DEVICE

(71) Applicant: HONDA MOTOR CO., LTD., Tokyo (JP)

(72) Inventor: Takamasa Koshizen, Shioya-gun (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/766,581

(22) PCT Filed: Mar. 7, 2014

(86) PCT No.: PCT/JP2014/056012
§ 371 (c)(1),
(2) Date: Aug. 7, 2015

(87) PCT Pub. No.: WO2014/136949
PCT Pub. Date: Sep. 12, 2014

(65) Prior Publication Data
US 2015/0379871 A1 Dec. 31, 2015

(30) Foreign Application Priority Data
Mar. 8, 2013 (JP) ................... 2013-046969

(51) Int. Cl.
*G08G 1/00* (2006.01)
*G08G 1/09* (2006.01)
(Continued)

(52) U.S. Cl.
CPC ........... *G08G 1/0133* (2013.01); *B60W 40/04* (2013.01); *G08G 1/00* (2013.01); *G08G 1/01* (2013.01); *G08G 1/0112* (2013.01); *G08G 1/13* (2013.01)

(58) Field of Classification Search
USPC .......................................... 701/118; 340/905
See application file for complete search history.

(56) References Cited

U.S. PATENT DOCUMENTS 6,434,512 B1* 8/2002 Discenzo ................ F16C 19/52
702/184
2002/0060640 A1* 5/2002 Davis .................... G01S 13/583
342/104
(Continued)

FOREIGN PATENT DOCUMENTS

CN 102313555 A 1/2012
JP 2002-190090 A 7/2002
(Continued)

OTHER PUBLICATIONS

International Search Report dated Apr. 1, 2014, issued in counterpart application No. PCT/JP2014/056012 (3 pages).
(Continued)

Primary Examiner — Tyler Paige
(74) Attorney, Agent, or Firm — Westerman, Hattori, Daniels & Adrian, LLP

(57) ABSTRACT

A congestion sign detection method that is executed by a congestion sign detection device 10 which includes three-dimensional acceleration sensor 14 that acquires acceleration information in each axis direction of an X axis, a Y axis, and a Z axis forming an orthogonal coordinate system of the three-dimensional space. The method includes: an input data calculation step of calculating an acceleration vector using the acceleration information acquired by the three-dimensional acceleration sensor 14, and calculating a norm of a difference of the vectors at two different timings as input data; a frequency analysis step of calculating an autocorrelation of the input data and calculating a power spectrum by performing a Fourier transform on the autocorrelation; an angle information acquisition step of converting the power (Continued)

spectrum into angle information; and a congestion sign detection step of detecting congestion sign according to the angle information.

10 Claims, 12 Drawing Sheets

(51) Int. Cl.
*G08G 1/01* (2006.01)
*B60W 40/04* (2006.01)
*G08G 1/13* (2006.01)

(56) References Cited

U.S. PATENT DOCUMENTS

| | | | | |
|---|---|---|---|---|
| 2002/0198632 A1* | 12/2002 | Breed | ............... | B60N 2/2863 701/1 |
| 2003/0135304 A1* | 7/2003 | Sroub | ............... | G06Q 10/08 701/1 |
| 2003/0191568 A1* | 10/2003 | Breed | ............... | B60W 40/06 701/36 |
| 2005/0060069 A1* | 3/2005 | Breed | ............... | B60N 2/2863 701/408 |
| 2005/0134440 A1* | 6/2005 | Breed | ............... | B60N 2/2863 340/435 |
| 2005/0192727 A1* | 9/2005 | Shostak | ............... | B60C 11/24 701/37 |
| 2008/0030371 A1* | 2/2008 | Kumagai | ............... | G01C 21/26 340/905 |
| 2008/0215202 A1* | 9/2008 | Breed | ............... | G01C 21/3611 701/25 |
| 2008/0215231 A1* | 9/2008 | Breed | ............... | G08G 1/161 701/117 |
| 2009/0271084 A1 | 10/2009 | Taguchi | | |
| 2012/0310531 A1* | 12/2012 | Agarwal | ............... | H04W 72/1252 701/439 |
| 2012/0323474 A1* | 12/2012 | Breed | ............... | B60W 30/04 701/117 |
| 2013/0063282 A1* | 3/2013 | Baldwin | ............... | B61L 29/282 340/941 |
| 2013/0261944 A1* | 10/2013 | Koshizen | ............... | G08G 1/00 701/118 |
| 2014/0229568 A1* | 8/2014 | Raffa | ............... | H04L 67/12 709/217 |

FOREIGN PATENT DOCUMENTS

| | | |
|---|---|---|
| JP | 2008-40825 A | 2/2008 |
| JP | 2009-262862 A | 11/2009 |
| JP | 2010-286344 A | 12/2010 |
| JP | 2013-041316 A | 2/2013 |
| WO | 2012/081209 A1 | 6/2012 |

OTHER PUBLICATIONS

Office Action dated and partial Search Report May 4, 2016, issued in counterpart Chinese Patent Application No. 201480005087.X with English translation. (6 pages).

* cited by examiner

CONGESTION SIGN DETECTION METHOD, PROGRAM, AND CONGESTION SIGN DETECTION DEVICE

TECHNICAL FIELD

The present invention relates to a congestion sign detection method, a program, and a congestion sign detection device.

Priority is claimed on Japanese Patent Application No. 2013-046969, filed Mar. 8, 2013, the content of which is incorporated herein by reference.

BACKGROUND ART

In the related art, a congestion prediction method is known, in which the acceleration of a vehicle is acquired based on a vehicle speed detected by a vehicle speed sensor, a power spectrum is calculated by performing a frequency analysis on the acceleration, a single regression line is calculated by performing a single regression analysis on the power spectrum, and then, congestion prediction is performed based on a maximum value of a slope of the single regression line (for example, refer to Patent Document 1).

CITATION LIST

Patent Document

[Patent Document 1] PCT International Publication No. WO 2012/081209

SUMMARY OF INVENTION

Technical Problem

According to the congestion prediction method in the related art described above, it is desired that an accuracy of the congestion prediction is improved while the convenience in using is improved.

Aspects of the present invention have been made in consideration of above-described circumstance and have an object to provide a congestion sign detection method, a program, and a congestion sign detection device in which the accuracy of the congestion prediction can be improved while the convenience in using is improved.

Solution to Problem

In order to solve the above problems and achieve the object described above, the present invention adopts the following aspects.

(1) A congestion sign detection method according to an aspect of the present invention is executed by an electronic device which includes an acceleration information acquisition portion configured to acquire acceleration information in each axis direction of a first axis to a third axis forming an orthogonal coordinate system of the three-dimensional space. The method includes: an input data calculation step of calculating an acceleration vector in the three-dimensional space using the acceleration information acquired by the acceleration information acquisition portion, and calculating a norm of a difference of the vectors at two different timings as input data; a frequency analysis step of calculating an autocorrelation of the input data and calculating a power spectrum by performing a Fourier transform on the autocorrelation; an angle information acquisition step of converting the power spectrum into angle information; and a congestion sign detection step of detecting congestion sign according to the angle information.

(2) In the congestion sign detection method disclosed in the above (1), in the angle in formation acquisition step, a single regression line at a low frequency region where a frequency of the power spectrum is equal to or lower than a predetermined frequency may be calculated, and a slope of the single regression line may be converted into the angle information.

(3) In the congestion sign detection method disclosed in the above (1), in the congestion sign detection step, a congestion sign may be detected according to a variation of the angle information corresponding to time.

(4) A congestion sign detection method according to another aspect of the present invention is executed by a congestion sign detection system which includes a server device, and an electronic device that includes an acceleration information acquisition portion configured to acquire acceleration information in each axis direction of a first axis to a third axis forming an orthogonal coordinate system of the three-dimensional space and a present position information acquisition portion configured to acquire present position information. The method includes: an input data calculation step of causing the electronic device to calculate an acceleration vector in the three-dimensional space using the acceleration information acquired by the acceleration information acquisition portion, and to calculate a norm of a difference of the vectors at two different timings as input data; a frequency analysis step of causing the electronic device to calculate an autocorrelation of the input data and calculating a power spectrum by performing a Fourier transform on the autocorrelation; an angle information acquisition step of causing the electronic device to convert the power spectrum into angle information; an electronic device information transmission step of causing the electronic device to transmit the angle information and the present position information acquired by the present position information acquisition portion to the server device; a position range congestion sign detection step of causing the server device to detect a congestion sign within a position range by the number and proportion of the electronic devices in which an absolute value of the angle within the appropriate position range becomes equal to or greater than a predetermined value using the present position information and the angle information received from at least one or more electronic devices; and a server information transmission step of causing the server device to transmit the congestion sign information within the position range to the electronic device in the position range.

(5) A program according to another aspect of the present invention causes a computer configuring an electronic device which includes an acceleration information acquisition portion configured to acquire acceleration information in each axis direction of a first axis to a third axis forming an orthogonal coordinate system of the three-dimensional space to inaction as an input data calculation portion configured to calculate an acceleration vector in the three-dimensional space using the acceleration information acquired by the acceleration information acquisition portion, and calculate a norm of a difference of the vectors at two different timings as input data; a frequency analysis portion configured to calculate an autocorrelation of the input data calculated by the input data calculation portion, and calculating a power spectrum by performing a Fourier transform on the autocorrelation; an angle information acquisition portion configured to convert the power spectrum calculated by the frequency analysis portion into angle information; and a congestion sign detection portion configured to detect a congestion sign according to the angle information acquired by the angle information acquisition portion.

(6) In the program disclosed in the above (5), the angle information acquisition portion may calculate a single regression line at a low frequency region where a frequency of the power spectrum is equal to or lower than a predetermined frequency and may convert a slope of the single regression line into the angle information.

(7) in the program disclosed in the above (5), the congestion sign detection portion may detect a congestion sign according to a variation of the angle information corresponding to time.

(8) A congestion sign detection device according to another aspect of the present invention includes: an acceleration information acquisition portion configured to acquire acceleration information in each axis direction of a first axis to a third axis forming an orthogonal coordinate system of the three-dimensional space; an input data calculation portion configured to calculate an acceleration vector in the three-dimensional space using the acceleration information acquired by the acceleration information acquisition portion, and calculating a norm of a difference of the vectors at two different timings as input data; a frequency analysis portion configured to calculate an autocorrelation of the input data calculated by the input data calculation portion, and calculating a power spectrum by performing a Fourier transform on the autocorrelation; an angle information acquisition portion configured to convert the power spectrum calculated by the frequency analysis portion into angle information; and a congestion sign detection portion configured to detect a congestion sign according to the angle information acquired by the angle information acquisition portion.

(9) In the congestion sign detection device disclosed in the above (8), the angle information acquisition portion may calculate a single regression line at a low frequency region where a frequency of the power spectrum is equal to or lower than a predetermined frequency, and may convert a slope of the single regression line into the angle information.

(10) In the congestion sign detection device disclosed in the above (8), the congestion sign detection portion may detect a congestion sign according to a variation of the angle information corresponding to time.

Advantageous Effects of Invention

According to the congestion sign detection method in the aspect disclosed in the above (1), a resistance to noise in detecting the congestion sign can be improved, and it is possible to improve the detection accuracy by using the acceleration vector in the three-dimensional space indicating the sharper change of the congestion sign (that is, the possibility of congestion occurring) compared to the case of using the acceleration information of one axis direction or only the axis direction in the plane.

Furthermore, by using the norm of the difference of the acceleration vectors at two different timings as the input data of the frequency analysis, an appropriate frequency analysis can be performed on the acceleration occurring in the electronic device regardless of the position or the posture of the electronic device, and thus, it is possible to improve the usability.

Furthermore, in the case of the above (2), in chaos theory, the influence of the low frequency power spectrum on the congestion prediction is larger than that of the high frequency power spectrum. For this reason, the detection accuracy of the congestion sign can be improved by convening the power spectrum of the low frequency region into the angle information corresponding to the slope of the single regression line by the least-square method. Furthermore, it is possible to accurately predict an energy consumption rate of the moving body that moves together with the electronic device.

For example, as the angle increases in the negative direction, a delay in a dynamic time response of the acceleration and deceleration, is changed in an increase tendency, and thus, the variation in speed increases. Therefore, it is difficult to limit the driving region in which the energy efficiency of the moving body such as the vehicle is prioritized. Accordingly, the congestion easily occurs and the energy efficiency decreases.

Furthermore, in the case of the above (3), by using the information of the variation of the angle corresponding to time, the detection accuracy of the congestion sign can be improved compared to the case of using only the information of the spectrum angle at the appropriate timing, and it is possible to accurately predict the energy consumption rate of the moving body that moves together with the electronic device.

For example, it can be determined whether or not the total power of the acceleration and deceleration in the predetermined time range exceeds the predetermined threshold value based on the information of a maintaining time in which the value of the angle is maintained, and in the case where it is determined that the total power exceeds the predetermined threshold value, it is possible to determine that the congestion easily occurs and the energy efficiency of the vehicle decreases.

Furthermore, it is possible to use foe information of the detected congestion sign as an index corresponding to the energy consumption rate of the moving body which moves together with the electronic device. For example, in the vehicle or the like, it is possible to present a variation of the energy consumption rate (for example, the fuel efficiency or the electricity efficiency) based on the information of the acceleration without the need to directly calculate the fuel efficiency or the electricity efficiency.

According to the congestion sign detection method in the aspect disclosed in the above (4), within the appropriate range of position, it is possible to integrally detect the congestion sign with consideration of the movement state of a plurality of moving bodies that move together with the electronic device in addition to the angle information of each electronic device. Furthermore, by providing the information of the congestion sign within the appropriate range of position to each electronic device, it is possible to efficiently suppress or eliminate the congestion in conjunction with the plurality of moving bodies that move together with the electronic device.

In addition, a resistance to noise in detecting the congestion sign can be improved, and it is possible to improve the detection accuracy by using the acceleration vector in the three-dimensional space indicating the sharper change of the congestion sign (that is, the possibility of congestion occurring) compared to the case of using the acceleration information in one axis direction, or only the axis direction in the plane.

Furthermore, by using the norm of the difference of the acceleration vectors at two different timings as the input data of frequency analysis, an appropriate frequency analysis can be performed on the acceleration occurring in the electronic device regardless of the position or the posture of the electronic device, and thus, it is possible to improve the usability.

According to the program in the aspect disclosed in the above (5), a resistance to noise in detecting the congestion sign can be improved, and it is possible to improve the detection accuracy by using the acceleration vector in the three-dimensional space indicating the sharper change of the congestion sign (that is, the possibility of congestion occurring) compared to the case of using the acceleration information of one axis direction or only the axis direction in the plane.

Furthermore, by using the norm of the difference of the acceleration vectors at two different timings as the input data of frequency analysis, an appropriate frequency analysis can be performed on the acceleration occurring in the electronic device regardless of the position or the posture of the electronic device, and thus, it is possible to improve the usability.

Furthermore, in the case of the above (6), in chaos theory, the influence of the low frequency power spectrum to the congestion prediction is larger than that of the high frequency power spectrum. For this reason, the detection accuracy of the congestion sign can be improved by converting the power spectrum of the low frequency range into the angle information corresponding to the slope of the single regression line by the least-square method. Furthermore, it is possible to accurately predict an energy consumption rate of the moving body that moves together with the electronic device.

For example, as the angle increases so the negative direction, a delay in a dynamic time response of the acceleration and deceleration is changed in an increase tendency and thus, the variation in speed increases. Therefore, it is difficult to limit the driving region in which the energy efficiency of the moving body such as the vehicle is prioritized. Accordingly, the congestion easily occurs and the energy efficiency decreases.

Furthermore, in the case of the above (7), by using the information of the variation of the spectrum angle corresponding to time, the detection accuracy of the congestion sign can be improved compared to the case of using only the information of the spectrum angle at the appropriate timing, and it is possible to accurately predict the energy consumption rate of the moving body that moves together with the electronic device.

For example, if can be determined whether or not the total power of the acceleration and deceleration in the predetermined time range exceeds the predetermined threshold value based on the information of a maintaining time in which the value of the angle is maintained, and in the case where it is determined that the total power exceeds the predetermined threshold value, it is possible to determine that the congestion easily occurs and the energy efficiency of the vehicle decreases.

Furthermore, it is possible to use the information of the detected congestion sign as an index corresponding to the energy consumption rate of the moving body which moves together with the electronic device. For example, in the vehicle or the like, it is possible to present a variation of the energy consumption rate (for example, the fuel efficiency or the electricity efficiency) based on the information of the acceleration without the need to directly calculate the foe efficiency or the electricity efficiency.

According to the congestion sign detection device in the aspect disclosed in the above (8), a resistance to noise in detecting the congestion sign can be improved, and it is possible to improve the detection accuracy by using the acceleration vector in the three-dimensional space indicating the sharper change of the congestion sign (that is, the possibility of congestion occurring) compared to the case of using the acceleration information of one axis direction or only the axis direction in the plane.

Furthermore, by using the norm of the difference of the acceleration vectors at two different timings as the input data of frequency analysis, an appropriate frequency analysis can be performed on the acceleration occurring in the electronic device regardless of the position or the posture of the electronic device, and thus, it is possible to improve the usability.

Furthermore, in the case of the above (9), in chaos theory, the influence of the low frequency power spectrum to the congestion prediction is larger than that of the high frequency power spectrum. For this reason, the detection accuracy of the congestion sign can be improved by converting the power spectrum of the low frequency range into the angle information corresponding to the slope of the single regression line by the least-square method. Furthermore, it is possible to accurately predict an energy consumption rate of the moving body that moves together with the electronic device.

For example, as the angle increases in the negative direction, a delay in a dynamic time response of the acceleration and deceleration is changed in an increase tendency, and thus, the variation in speed increases. Therefore, it is difficult to limit the driving region in which the energy efficiency of the moving body such as the vehicle is prioritized. Accordingly, the congestion easily occurs and the energy efficiency decreases.

Furthermore, in the case of the above (10), by using the information of the variation of the spectrum angle corresponding to time, the detection accuracy of the congestion sign can be improved compared to the case of using only the information of the spectrum angle at the appropriate timing, and it is possible to accurately predict the energy consumption rate of the moving body that moves together with the electronic device.

For example, it can be determined whether or not the total power of the acceleration and deceleration in the predetermined time range exceeds the predetermined threshold value based on the information of a maintaining time in which the value of the angle is maintained, and in the case where it is determined that the total power exceeds the predetermined threshold value, it is possible to determine that the congestion easily occurs and the energy efficiency of the vehicle decreases.

Furthermore, it is possible to use the information of the detected congestion sign as an index corresponding to the energy consumption rate of the moving body which moves together with the electronic device. For example, in the vehicle or the like, it is possible to present a variation of the energy consumption rate (for example, the fuel efficiency or the electricity efficiency) based on the information of the acceleration without the need to directly calculate the fuel efficiency or the electricity efficiency.

DESCRIPTION OF EMBODIMENTS

Figure 1:
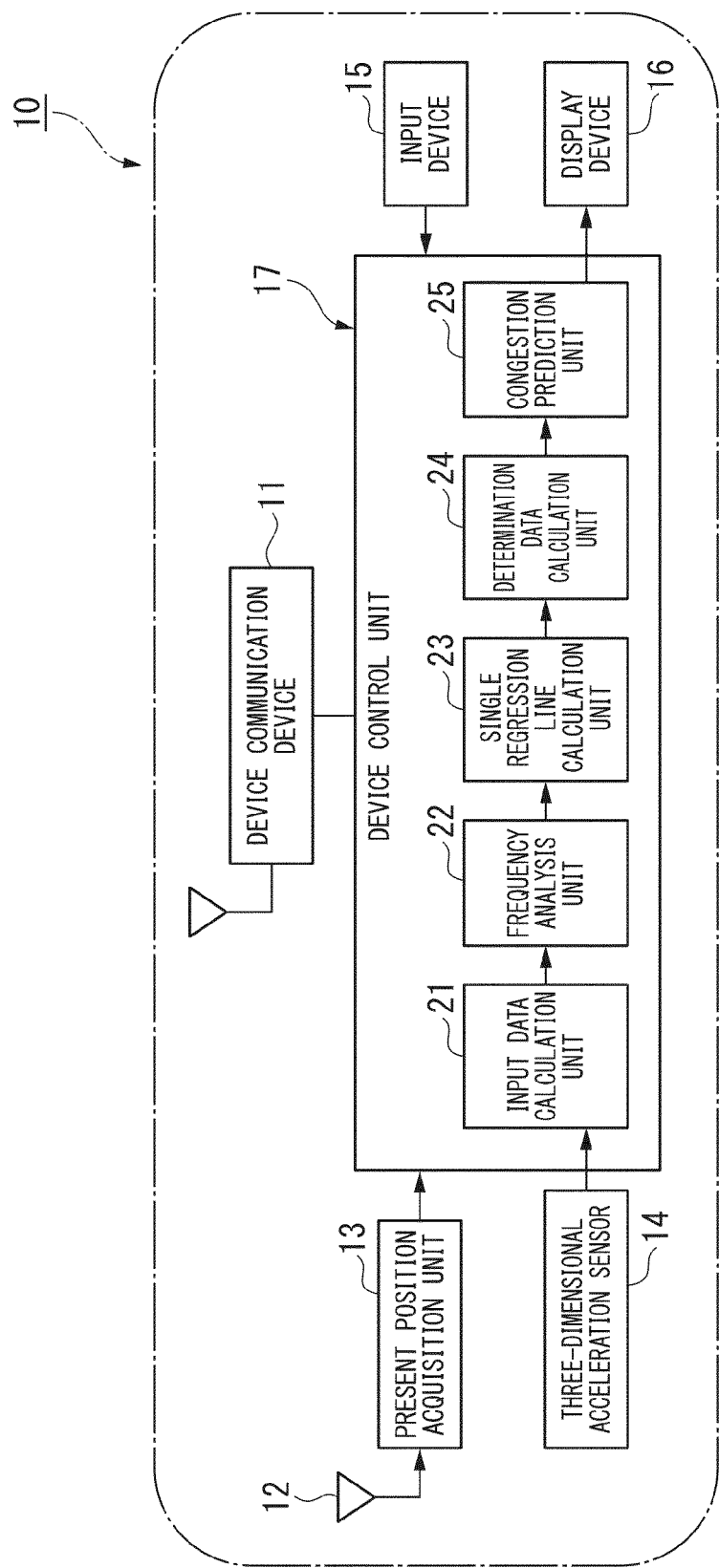
FIG. 1 is a configuration diagram of a congestion sign detection device that realizes a congestion sign detection method in an embodiment of the present invention.

Hereinafter, an embodiment of a congestion sign detection method, a program, and a congestion sign detection device in the present invention will be described with reference to the drawings attached hereto.

The congestion sign detection device 10 in the present embodiment is, for example, a mobile terminal that is carried by an occupant of a moving body such as a vehicle, an information device that is detachably mounted on a moving body such as a vehicle, or an electronic device such as a navigation device that is mounted on a moving body such as a vehicle in advance.

The congestion sign detection device 10 is capable of interactively communicating with an external device through wireless communication via wireless communication network system that includes base stations or the life.

Wireless communication network system includes, for example, a base station for wireless communications, and a public telecommunication network such as the internet that performs a wired connection between the base station and the external device. In this wireless communication network system, information transmitted from the external device is received by the base station through the wired communication, and is transferred to the congestion sign detection device 10 through wireless communications from the base station.

In addition, information transmitted from the congestion sign detection device 10 through wireless communication is received by the base station and is transferred to the external device from the base station through the wired communication.

The congestion sign detection device 10 includes a device communication device 11, a positioning signal receiver 12, the present position acquisition unit 13, a three-dimensional acceleration sensor 14, an input device 15, a display device 16, and a device control unit 17.

The device communication device 11 can communicate with the external device via various wireless communication network systems such as a client server type, and transmits and receives various signals. The communication between the congestion sign detection device 10 and the external device is not limited to the above-described types of communication, but other types of communication such as communications via a communication satellite may adopted.

The positioning signal receiver 12 receives a positioning signal used in a positioning system (for example, a global positioning system (GPS) or a global navigation satellite system (GNSS)) which is used for measuring the position of the congestion sign detection device 10 using, for example, a satellite.

The present position acquisition unit 13 detects the present position of the congestion sign detection device 10 using the positioning signal received by the positioning signal receiver 12.

The three-dimensional acceleration sensor 14 is a 3-axes acceleration sensor in winch there are 3 detection axes, and detects an acceleration generated in the congestion sign detection device 10 during a predetermined sampling cycle as acceleration in each axis direction of an X axis, a Y axis, and a Z axis forming an orthogonal coordinate system of the three-dimensional space.

The input device 15 includes, for example, a switch, a touch panel, a keyboard, or a voice input device, and outputs various signals according to various input operations of an operator.

The display device 16 is a display such as a liquid crystal display, and displays various information items output from the device control unit 17.

The device control unit 1 controls various operations of the congestion sign detection device 10.

The device control unit 17 includes input data calculation unit 21, a frequency analysis unit 22, a single regression line calculation unit 23, a determination data calculation unit 24, and a congestion prediction unit 25.

The input data calculation unit 21 calculates vectors A of the acceleration in the three-dimensional space using the acceleration it each axis direction of the X axis, the Y axis, and the Z axis detected by the three-dimensional acceleration sensor 14. Then, as input data input to the frequency analysis unit 22, the input data calculation unit 21 calculates a norm u of a difference ΔA of two acceleration vectors A (difference of acceleration vectors) at two different timings in a time interval such as a sampling cycle ΔT.

Figure 2:
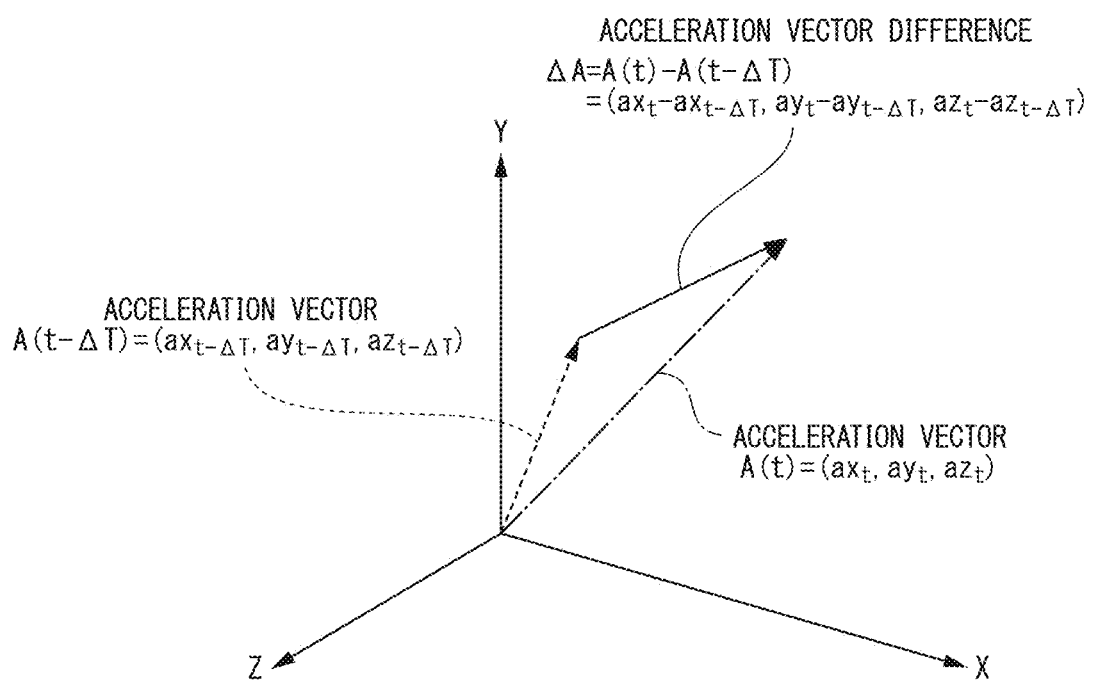
FIG. 2 is a diagram illustrating an example of a difference of acceleration vectors in the embodiment of the present invention.

As illustrated in FIG. 2, the input data calculation unit 21 calculates the difference of the acceleration vectors ΔA=A(t)−A(t−ΔT) using, for example, an acceleration vector A(t)=(ax$_t$, ay$_t$, az$_t$) at an appropriate time t and an acceleration vector A(t−ΔT)=(ax$_{t-\Delta T}$, ay$_{t-\Delta T}$, az$_{t-\Delta T}$) at the time t−ΔT that is the time earlier than t by sampling period ΔT. Then, as indicated in following Equation (1), the norm u$_t$ of the difference ΔA of the acceleration vector is calculated.

A size of a buffer (not illustrated) in which the acceleration information in each axis direction of the X axis, the Y axis, and the Z axis detected by the three-dimensional acceleration sensor 14 can be stored, that is, the number of samples of the acceleration information can be appropriately set by the operator on an appropriate setting screen displayed on the display device 16.

[Equation 1]

$$u_t = \sqrt{(ax_t - ax_{t-\Delta T})^2 + (ay_t - ay_{t-\Delta T})^2 + (az_t - az_{t-\Delta T})^2} \, . \quad (1)$$

The frequency analysis unit 22 performs a frequency analysis on the input data calculated by the input data calculation unit 2 and calculates a power spectrum (acceleration spectrum) corresponding to the frequency.

For example, the frequency analysis unit 22 calculates an autocorrelation of the input data using the number of input and output points and the number of delays of the autocorrelation of the input data for the frequency analysis. Then, the acceleration spectrum is calculated by performing a fast Fourier transform on the autocorrelation. The number of input and output points and the number of delays of the autocorrelation of the input data for the frequency analysis and a selection whether or not to subtract the average value from the input value of the autocorrelation can be set by the operator on the appropriate setting screen displayed on the display device 16.

For example, the frequency analysis unit 22 calculates the acceleration spectrum in a certain period by performing the calculation of the autocorrelation and the fast Fourier transform on the number of input and output points of the input data calculated by the input data calculation unit 21 in the sampling cycle ΔT.

The single regression line calculation unit 23 calculates a single regression line in a predetermined frequency range of the acceleration spectrum calculated by the frequency analysis unit 22, and converts the slope of the single regression line into information of the angle (spectrum angle).

Figure 3:
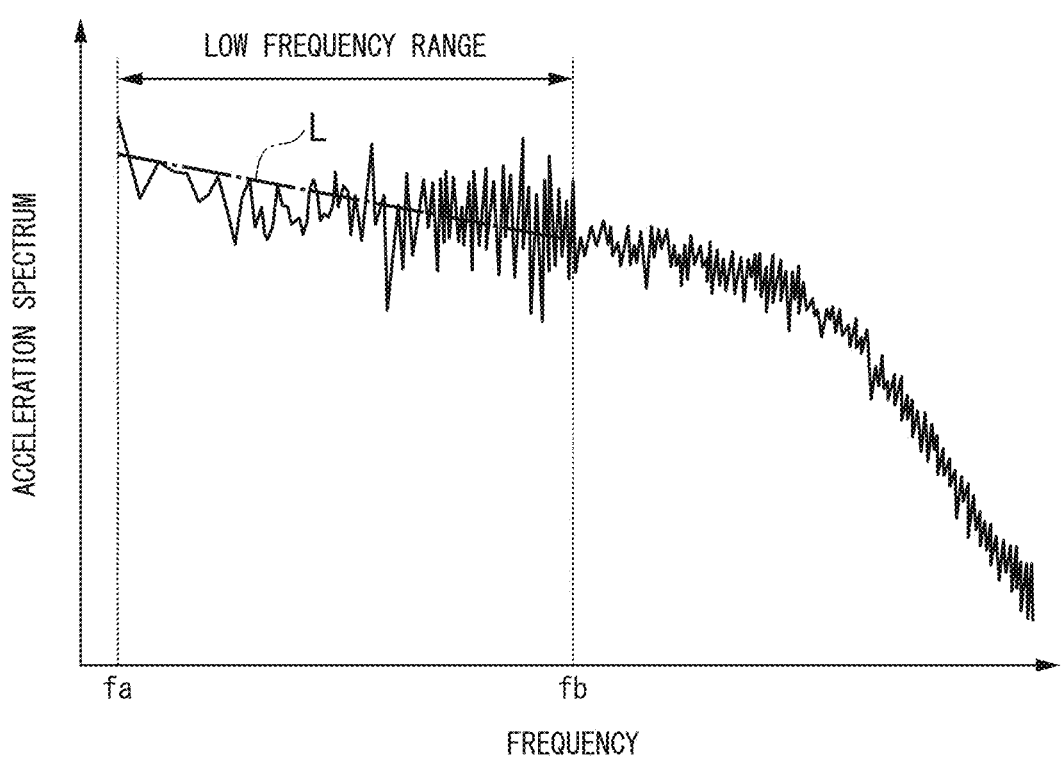
FIG. 3 is a diagram illustrating an example of an acceleration spectrum in the embodiment of the present invention.

For example, in chaos theory, the influence of the low frequency power spectrum to the congestion prediction is larger than that of the high frequency power spectrum. For this reason, as illustrated in FIG. 3, the single regression line calculation unit 23 calculates the single regression line L by performing the least-square method on the acceleration spectrum of low frequency range equal to or lower than a predetermined frequency fb (for example, a frequency range between a frequency equal to higher than the lower limit frequency fa and a frequency equal to or lower than the predetermined frequency fb). Then, the single regression line calculation unit 23 converts the slope of the calculated single regression line L into the information of the angle (spectrum angle) θ.

For example, as the spectrum angle θ increases in the negative direction (that is, as the absolute value increases with negative sign), a delay in a dynamic time response of the acceleration and deceleration is changed in an increase tendency, and thus, the variation in speed increases. For this reason, it is difficult to limit the driving region in which the energy efficiency of the vehicle (fuel efficiency, electricity efficiency, or the like) is prioritized. Accordingly, the congestion easily occurs and the energy efficiency decreases.

For example, the case where the absolute value of the spectrum angle θ is small is equivalent to the case where a shock wave (vibration or fluctuation) from a preceding vehicle to the vehicle moving together with the congestion sign detection device 10 is small. Thus, the delay in response with respect to the preceding vehicle is small, and the vehicle-to-vehicle distance becomes great such that the vehicle group is not easily formed. That is, the above case is equivalent to the case where the probability of the occurrence of congestion becomes low.

Conversely, the case where the absolute value of the spectrum angle θ is large is equivalent to the case where a shock wave (vibration or fluctuation) from a preceding vehicle to the vehicle moving together with the congestion sign detection device 10 is large. Thus, the delay in response with respect to the preceding vehicle is large, and the vehicle group easily becomes dense. That is, the above case is equivalent to the case where the probability of the occurrence of congestion becomes high. The shock wave (the vibration or the fluctuation) described here means that, when the vehicle repeats the operations of acceleration and deceleration, such operations (moving forward and backward) are propagated to the following vehicles as a kind of vibration.

The determination data calculation unit 24 calculates information indicating the variation of the angle corresponding to time (for example, information of a maintaining time in which the value of the angle is maintained, information of a convergence time which is required for the absolute value of the angle to be converged to zero, or the like) as determination data input to the congestion prediction unit 25 using the angle information calculated by the single regression line calculation unit 23.

The determination data calculation unit 24, for example, as illustrated in Equation (2) below, calculates determination data S$_N$ using the determination interval N (N is natural number) and an angle threshold value θ$_T$ and an angle θ$_j$ (j is a natural number equal to or smaller than N) calculated in the determination interval N by the single regression line calculation unit 23. The determination interval N and the angle threshold value θ$_T$, for example, can be set by the operator on the appropriate setting screen displayed on the display device 16. Then, the determination interval N is, for example, the number of points of the angle information corresponding to a period which can appropriately set by the operator, that is, the number of points of the angle information calculated in the period by the single regression line calculation unit 23.

For example, the determination data calculation unit 24 calculates the determination data S$_N$ in the determination interval N that corresponds to a predetermined period based on the angle θ$_j$ (1≤j≤N) calculated by the single regression line calculation unit 23 in the sampling cycle ΔT. The angle threshold value θ$_T$ can be set to an arbitrary number by the operator. However, the angle threshold value θ$_T$ is "−45" which is generally known as (1/t) fluctuation characteristics.

[Equation 2]

$$S_N = \sum_{j=1}^{N} \frac{\theta_j}{N\theta_T} \quad (2)$$

The determination data $S_N$ in Equation (2) indicates a comparison between a total power of acceleration and deceleration during the predetermined period corresponding to the determination interval N and the predetermined threshold value corresponding to the predetermined angle threshold value $\theta_T$. For example, in the case where the total power exceeds the predetermined threshold value, the congestion easily occurs and the energy efficiency (the fuel efficiency or the electricity efficiency) of the vehicle decreases.

Figure 4:
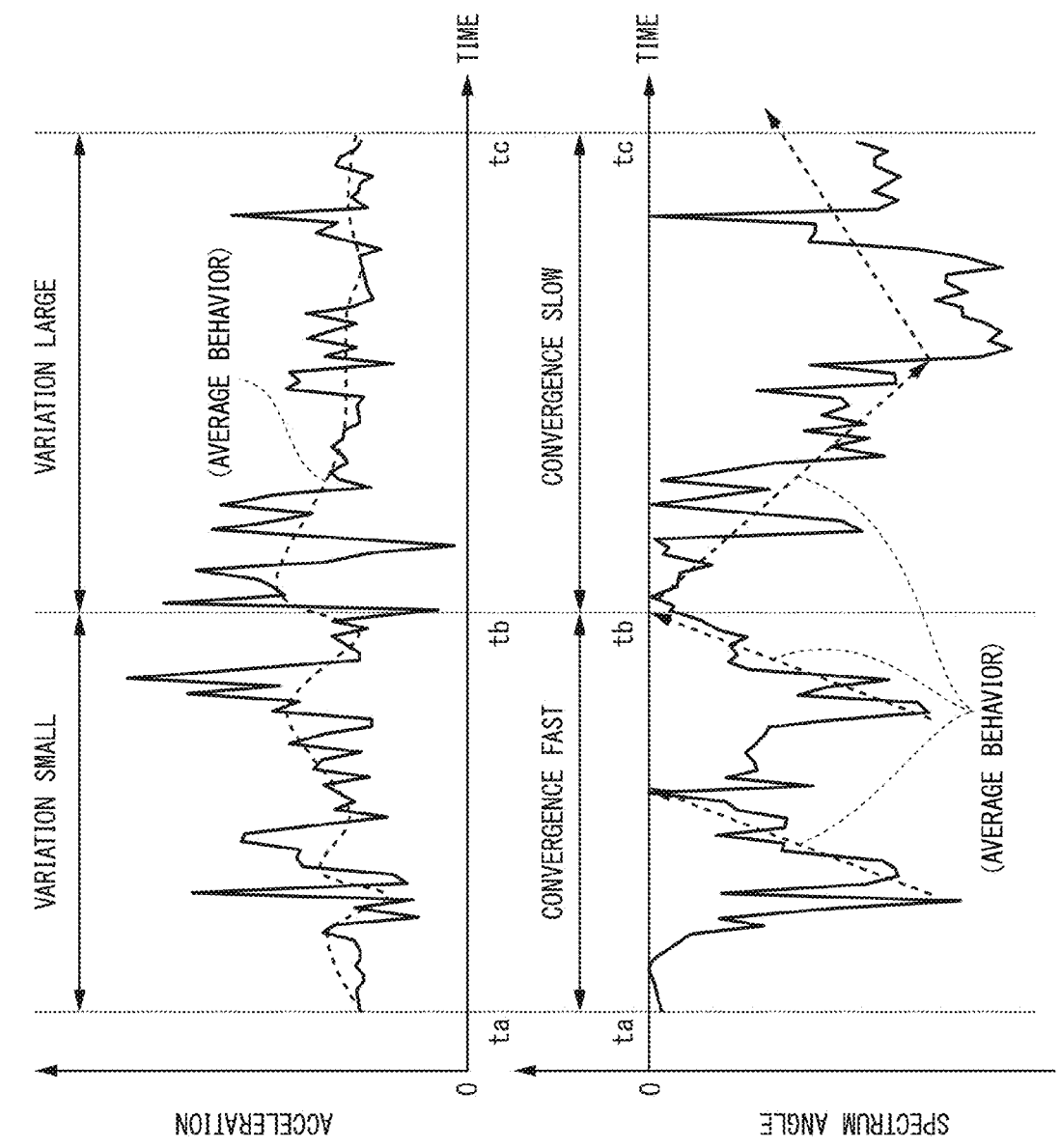
FIG. 4 is a diagram illustrating an example of variations and average behavior of the acceleration and the spectrum angle corresponding to time in the embodiment of the present invention.

For example, as the variations and the average behavior of the acceleration and the spectrum angle in the period from time ta to time tb illustrated in FIG. 4, in the case where the vehicle speed reaches a constant traveling speed from a stop state by an appropriate acceleration, the variation of the acceleration is small. Then, even if the absolute value of the spectrum angle increases temporarily, since the spectrum angle immediately converges toward zero, the value of the total power of acceleration and deceleration becomes small.

In addition, for example, as the variations and the average behavior of the acceleration and the spectrum angle in the period from time ta to time tb illustrated in FIG. 4, in the case where the vehicle travel at a constant speed of the speed slightly decreases due to an engine brake or the like, the variation of the acceleration is small. Then, since the absolute value of the spectrum angle is maintained to be small, the value of the total power of acceleration and deceleration becomes small. In this case, even if the absolute value of the spectrum angle temporarily increases due to a vibration or the like, since the absolute value of the spectrum angle immediately converges toward zero, the value of the total power of acceleration and deceleration becomes small. In addition, for example, even if the absolute value of the spectrum angle temporarily increases due to an error of the detection by the three-dimensional acceleration sensor 14, since the absolute value of the spectrum angle immediately converges toward zero, the value of the total power of acceleration and deceleration becomes small.

On the other hand, for example, as the variations and the average behavior of the acceleration and the spectrum angle in the period from time tb to time tc illustrated in FIG. 4, in the case where the vehicle is rapidly decelerated or decelerated immediately after the acceleration, the variation of the acceleration is large. Then, since the absolute value of the angle spectrum becomes large and it takes a long time to converge toward zero, the value of the total power of acceleration and deceleration becomes large.

The congestion prediction unit 25 detects a congestion sign that indicates a possibility of the congestion (traffic jam) occurring in the future or a possibility that the congestion has occurred already according to the determination data calculated by the determination data calculation unit 24. The degree of the congestion sign which indicates the size of the congestion sign becomes large in the case where the possibility of congestion is high in front of the traveling direction of the vehicle moving together with the congestion sign detection device 10 and becomes small in the case where the possibility of congestion is low.

The congestion prediction unit 25, for example, determines whether or not the determination data $S_N$ calculated by the determination data calculation unit 24 exceeds an appropriate threshold value (that is, a threshold value of a strength of the variation of the acceleration). Then, in the case where the determination data $S_N$ exceeds the threshold value, the congestion prediction unit 25 determines the situation as the energy efficiency (the fuel efficiency or the electricity efficiency) of the vehicle tends to decrease, and the congestion easily occurs. The appropriate threshold value for the determination data $S_N$, for example, can be set by the operator on the appropriate setting screen displayed on the display device 16.

For example, the congestion prediction unit 25 can obtain a function (for example, $y=\alpha x+\beta$) that indicates a relationship between the size (x) by winch an amount of the determination data $S_N$ exceeds the threshold value and the degree of the congestion sign (y) in advance, and then, can calculate the degree of the congestion sign (y) with respect to a combination of the determination data $S_N$ calculated by the determination data calculation unit 24 and the threshold value.

In addition, the congestion prediction unit 25 can create a co-relationship between the determination data $S_N$ and the threshold value and the value of the corresponding degree of the congestion sign in advance and store the co-relationship as a table, and then also can obtain the degree of the congestion sign with respect to the determination data $S_N$ and the threshold value with reference to the table.

The congestion sign detection device 10 that realizes the congestion sign detection method in the present embodiment includes a configuration described above. Next, the operation of the congestion sign detection device 10, that is, the congestion sign detection method, will be described.

Figure 5:
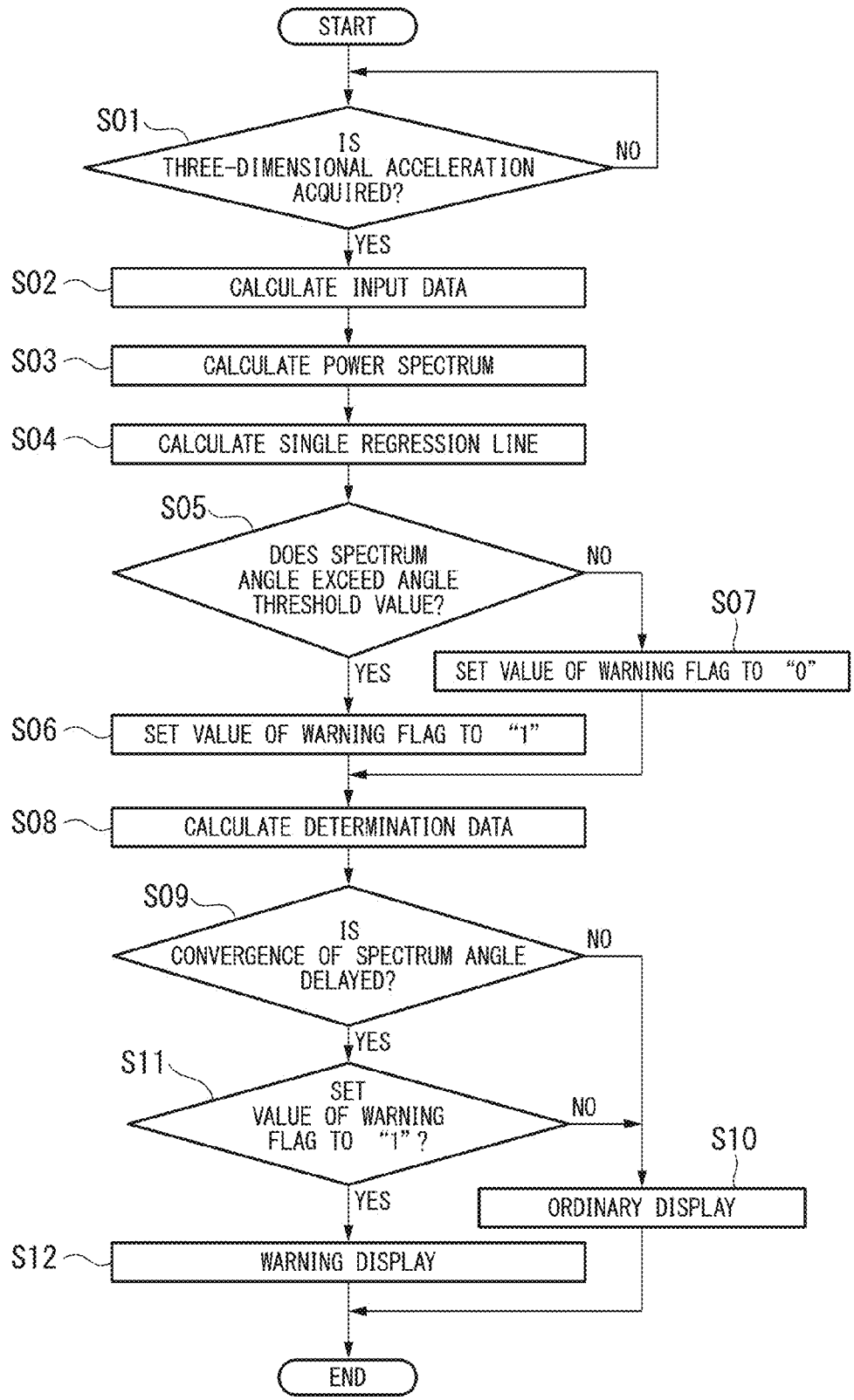
FIG. 5 is a flowchart illustrating the congestion sign detection method in the embodiment of the present invention.

First, in STEP S01 illustrated in FIG. 5, it is determined whether or not the acceleration in each axis direction of the X axis, the Y axis, and the Z axis is detected by the three-dimensional acceleration sensor 14.

In the case where the determination result is "No", the determination processing STEP S01 is repeatedly performed.

On the other hand, in the case where the determination result is "Yes", process proceeds to STEP S02.

Next in STEP S02 (an input data calculation step), an acceleration vector A in the three-dimensional space is calculated using the acceleration in each axis direction of the X axis, the Y axis, and the Z axis detected by the three-dimensional acceleration sensor 14. Then, the norm u of the difference ΔA of the acceleration vectors A (difference of acceleration vectors) at two different timings in the time interval during the sampling cycle ΔT is calculated as input data.

Next, in STEP S03 (a frequency analysis step), in the number of input and output points that can appropriately be set by the operator, the autocorrelation of the input data is calculated using the number of delays that can appropriately be set by the operator.

Then, the power spectrum (acceleration spectrum) is calculated by the fast Fourier transform being performed on the autocorrelation.

Next, in STEP S04 (an angle information acquisition step), the single regression line within the predetermined frequency range of the acceleration spectrum is calculated, and the slope of the single regression line is converted into the information of the angle (spectrum angle) θ.

Next in the STEP S05, it is determined whether or not the absolute value of the spectrum angle θ exceeds the angle threshold value $\theta_T$ that can appropriately be set by the operator.

In the case where the determination result is "Yes", the process proceeds to STEP S06, and in STEP S06, a flag value of a warning flag is set to "1" which indicates that the warning execution is permitted, and then, the process proceeds to STEP S08 described below.

On the other hand, in the case where the determination result is "No", the process proceeds to STEP S07, and in STEP S07, the flag value of the warning flag is set to "0" which indicates that the warning execution is not permitted, and then, the process proceeds to STEP S08.

Then, in STEP S08 (a congestion sign detection step), the determination data $S_N$ illustrated in the above Equation (2) is calculated as the information indicating the variation of the spectrum angle $\theta$ corresponding to time using the information of the spectrum angle $\theta$.

Next, in STEP S09 (a congestion sign detection step), by the determination of whether or not the determination data $S_N$ exceeds the threshold value that can appropriately be set by the operator (that is, the threshold value of the strength of the variation of the acceleration), it is determined whether the convergence of the spectrum angle $\theta$ toward zero is delayed.

In the case where the determination result is "No", the process proceeds to STEP S10, and in STEP S10, a predetermined ordinary screen (for example, a first interface screen P illustrated in FIG. 9A described below and a second interface screen Q illustrated in FIG. 10A) is displayed on the display device 16, and then, the process proceeds to "end".

On the other hand, in the case where the determination result is "Yes", the process proceeds to STEP S11.

Then, in STEP S11, it is determined whether or not the flag value of the warning flag is "1".

In the case where the determination result is "No", the process proceeds to the above-described STEP S10.

On the other hand, in the case where the determination result is "Yes" the process proceeds to STEP S12.

Then, in STEP S12, a predetermined warning screen (for example, the first interface screen P illustrated in FIG. 9C described below and the second interface screen Q illustrated in FIG. 10C) is displayed on the display device 16, and a predetermined warning sound is output from a speaker (not illustrated), and then, the process proceeds to "end".

In the case where the predetermined warning screen is displayed on the display device 16 and the case where the predetermined warning sound is output from the speaker (not illustrated), in order to prevent the display of the warning screen or the output of the warning sound in an extremely short time interval, for example, in units of milliseconds, an appropriate suppression time may be provided. The appropriate suppression time can appropriately be set by the operator, for example, in the appropriate setting screen displayed on the display device 16. A continuous display of the warning screen or a continuous output of the warning sound can be prohibited by the suppression time.

As described above, according to the congestion sign detection device 10 and the congestion sign detection method in the present embodiment, a resistance to noise in detecting the congestion sign can be improved, and it is possible to improve the detection accuracy by using the acceleration vector A in the three-dimensional space indicating the sharper change of the congestion sign (that is, the possibility of congestion occurring) compared to the case of using the acceleration information of one axis direction (for example, the front and backward direction of the progressing direction of the moving body such as the vehicle) or only the axis direction in the plane.

Furthermore, by using the norm u of the difference $\Delta A$ of the acceleration vectors A at two different timings as the input data of the frequency analysis, an appropriate frequency analysis can be performed on the acceleration occurring in the congestion sign detection device 10 regardless of the position or the posture of the congestion sign detection device 10, and thus, it is possible to improve the usability.

Furthermore, by converting the power spectrum in the low frequency range of which the influence to the congestion prediction is large into the angle information corresponding to the slope of the single regression line by the least square method, the detection accuracy of the congestion sign can be improved and it is possible to accurately predict an energy consumption rate (for example, the fuel efficiency or the electricity efficiency of the vehicle) of the moving body such as the vehicle.

Furthermore, by using the information of the variation of the spectrum angle corresponding to time, the detection accuracy of the congestion sign can be improved compared to the case of using only the information of the spectrum angle at the appropriate timing, and it is possible to accurately predict the energy consumption rate of the moving body such as the vehicle.

Furthermore, it is possible to use the information of the detected congestion sign as an index corresponding to the energy consumption rate (for example, the fuel efficiency or the electricity efficiency of the vehicle) of the moving body such as the vehicle which moves together with the congestion sign detection device 10. For example, in the vehicle or the like, it is possible to present a variation of the energy consumption rate (for example, the fuel efficiency or the electricity efficiency) based on the information of the acceleration without the need to directly calculate the fuel efficiency or the electricity efficiency.

Figure 6:
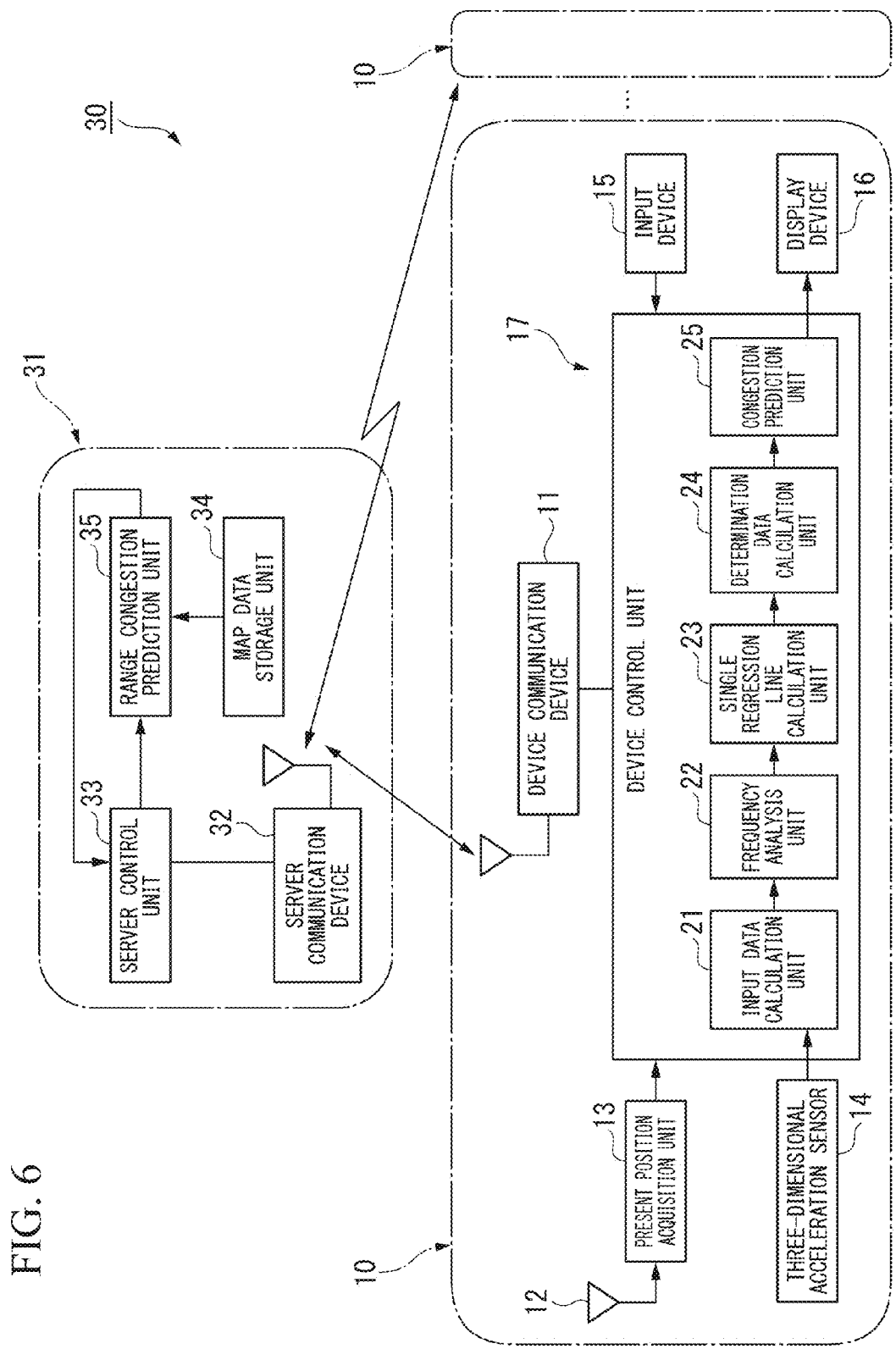
FIG. 6 is a configuration diagram of a congestion sign detection system that realizes the congestion sign detection method in a modification example of the embodiment of the present invention.

In the embodiment described above, for example, as a modification example illustrated in FIG. 6, a congestion sign defection system 30 may be configured with at least one or more congestion sign detection devices 10 and a server device 31 that can communicate with the congestion sign detection devices 10.

The server device 31 in this modification example includes a server communication device 32, a server control unit 33, a map data storage unit 34, and a range congestion prediction unit 35.

The server communication device 32 can bi-directionally communicate with the device communication device 11 of the congestion sign detection device 10 by wireless communication via wireless communication network system or road-to-vehicle communication via roadside communication devices, and transmits and receives various information items.

The server control unit 33 outputs various information items received by the server communication device 32 from the congestion sign detection device 10 to the range congestion prediction unit 35.

The congestion sign detection device 10 in the present modification example can, for example, transmit the angle information calculated by single regression line calculation unit 23, the determination data calculated by the determination data calculation unit 24, the information of the degree of the congestion sign calculated by the congestion prediction unit 25 or the like, and the present position information acquired by the present position acquisition unit 13 to the server device 31 as information based on the acceleration in each axis direction of the X axis, the Y axis, and the Z axis detected by the three-dimensional acceleration sensor 14.

The map data storage unit 34 stores the map data.

The map data includes road coordinate data that is necessary for the map matching processing based on the present position information of the congestion sign detection device 10 and that indicates lire position coordinate on the road, and road map data (for example, node, link, link cost, road shape, type of the road, and the like) that is necessary for the calculation of guide routes. The node is a coordinate point formed of the latitude and longitude of a predetermined point on the road such as intersections and branching points. The link is a line linking nodes and is a road section connecting the points. The link cost is information indicating a length of the road section corresponding to the link or time required for moving the road section.

With respect to a range within an appropriate position range based on the present position information received from at least one or more congestion sign detection devices 10, the range congestion prediction unit 35 detects the congestion sign within the position range by, for example, the number and proportion of the congestion sign detection devices 10 in which the absolute value of the angle, the determination data, or the degree of the congestion sign received front the congestion sign detection device 10 becomes equal to greater than a predetermined value. Then, the information of the congestion sign within the position range is transmitted to the congestion sign detection device 10 within the position range via the server communication device 32.

The congestion sign detection system 30 that realizes the congestion sign detection method according to the present modification example includes the configuration described above, and next, the operation of the congestion sign detection system 30, particularly, the operation of the congestion sign detection device 10, will be described.

Figure 7:
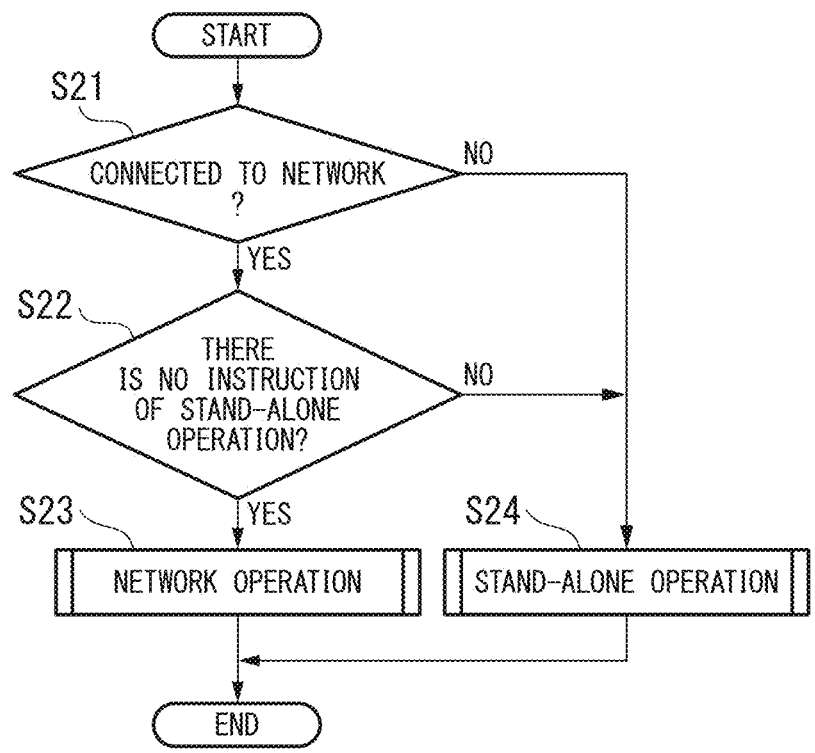
FIG. 7 is a flowchart illustrating the congestion sign detection method in the modification example of the embodiment of the present invention.

First, it STEP S21 illustrated in FIG. 7, it is determined whether or not the congestion sign detection device 10 is connected to a communication network such as wireless communication network system so as to be appropriately connected to the server device 31 via the communication network without any communication failure.

In the case where the determination result is "No", the processing in S21 is repeatedly executed.

On the other hand, in the case where the determination result is "Yes", the process proceeds to STEP S22.

There in STEP S22, it is determined whether or not there is no instruction to execute a stand-alone operation independent from an external device such as the server device 31.

In the case where the determination result is "Yes", that is, in the case where there is no instruction to execute a stand-alone operation, the process proceeds to STEP S23, and in STEP S23, a network operation described below is executed and the process proceeds to "end".

On the other hand, in the case where the determination result is "No", the process proceeds to STEP S24, and in STEP S24, the processing tasks from STEP S01 to STEPS 12 in the embodiment described above are executed as the stand alone operation.

Hereinafter, the above-described network operation in STEP S23 will be described.

Figure 8:
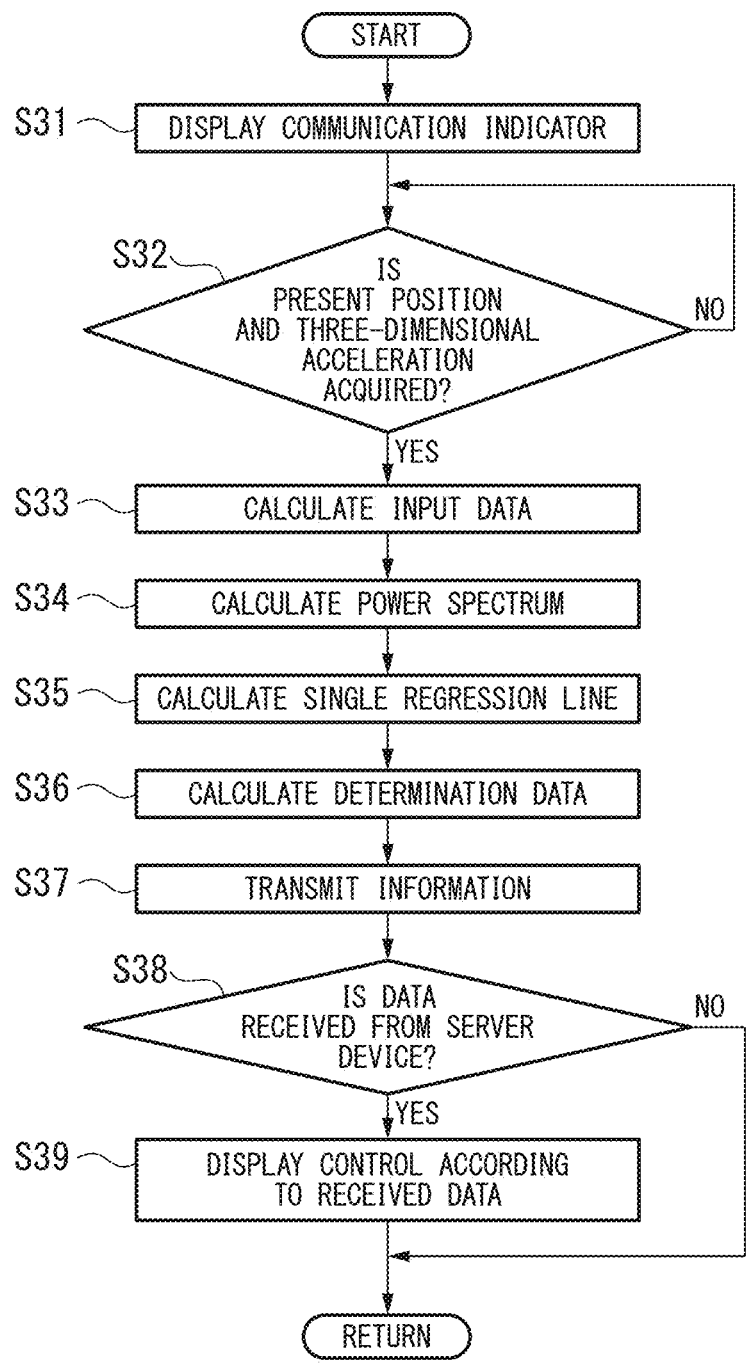
FIG. 8 is a flowchart illustrating a network operation illustrated in FIG. 7.

First, in STEP S31 illustrated in FIG. 8, a predetermined communication indicator that indicates that the congestion sign detection device 10 is connected to the communication network such as wireless communication network system so as to be appropriately connected to the server device 31 via the communication network without any communication failure, is displayed on the display device 16.

Next, in STEP S32, it is determined whether or not the acceleration in each axis direction of the X axis, the Y axis, and the Z axis is detected by the three-dimensional acceleration sensor 14 and whether or not the present position information is acquired by the present position acquisition unit 13.

In the case where the determination result is "No", the determination processing in STEP S32 is repeatedly executed.

On the other hand, in case where the determination result is "Yes", the process proceeds to STEP S33.

Next, in STEP S33 (the input data calculating step), the acceleration vector A in the three-dimensional space is calculated using the acceleration in each axis direction of the X axis, the Y axis, and the Z axis detected by the three-dimensional acceleration sensor 14. Then, the norm u of the difference ΔA of the acceleration vectors A (difference of the acceleration vectors) at the two different timings in the time interval of the sampling cycle ΔT is calculated as the input data.

Next, in STEP S34 (the frequency analysis step), the autocorrelation of the input data in the number of rapid and output points that can appropriately be set by the operator is calculated using the number of delays that can appropriately be set by the operator.

Then, the power spectrum (acceleration spectrum) is calculated by performing the fast Fourier transform on the autocorrelation.

Next, in STEP S35 (the angle information acquisition step), the single regression line at the predetermined frequency range of the acceleration spectrum is calculated and the slope of the single regression line is converted into the information of the angle (spectrum angle) θ.

Next, in STEP S36, the determination data $S_N$ indicated in Equation (2) is calculated as information indicating the variation of the spectrum angle θ corresponding to time using the information of the spectrum angle θ.

Next, in STEP S37 (the electronic device information transmission step), the information of the determination data $S_N$ is transmitted to the server device 31 via the device communication device 11.

Next, in STEP S38, it is determined whether or not the information of the congestion sign detection by the server device 31 within the appropriate range of position is received from the server device 31.

In the case where the determination result is "No", the process proceeds to "return".

On the other hand, in the case where the determination result is "Yes", the process proceeds to STEP S39, and in the STEP S39, the display screen corresponding to the information of the congestion sign received by the server device 31 within the appropriate range of position is displayed on the display device 16, and the process proceeds to "return".

According to the congestion sign detection system 30 and the congestion sign detection method in this modification example, within the appropriate range of position, it is possible to integrally detect the congestion sign with considering the movement state of a plurality of moving bodies such as vehicles that move together with the congestion sign detection devices 10 in addition to the information of the spectrum angle of each congestion sign detection device 10. Furthermore, by providing the information of the congestion sign within the appropriate range of position to each congestion sign detection device 10, it is possible to efficiently suppress or eliminate the congestion in conjunction with the plurality of moving bodies such as vehicles that move together with the congestion sign detection devices 10.

In the embodiment and the modification example described above, the congestion sign detection device 10 can display the congestion sign detected by the congestion prediction unit 25 or the degree of the congestion sign calculated by the congestion prediction unit 25 in a plurality of interface screens (for example, the first interface screen P illustrated in FIGS. 9A to 9D, the second, interlace screen Q illustrated in FIGS. 10A to 9D, and the like) that can be appropriately selected by the operator on the display device 16 in a plurality of stages (for example, three stages)

Figure 9A:
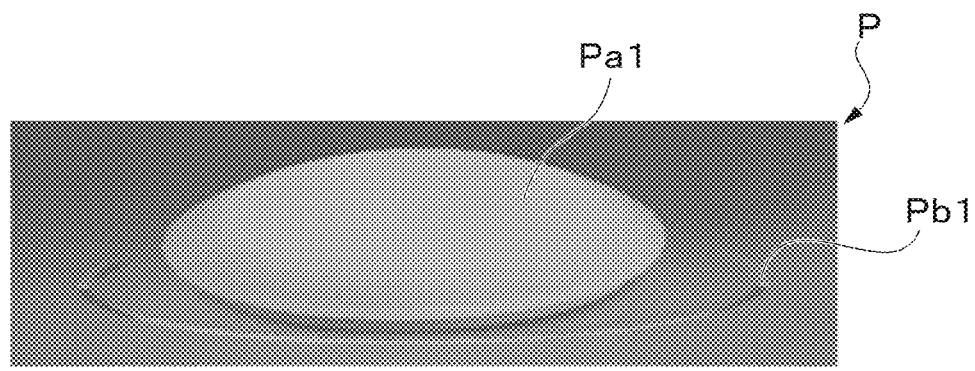
FIG. 9A is a diagram illustrating an example of a display screen in the congestion sign detection device in the modification example and the embodiment of the present invention.
Figure 10A:
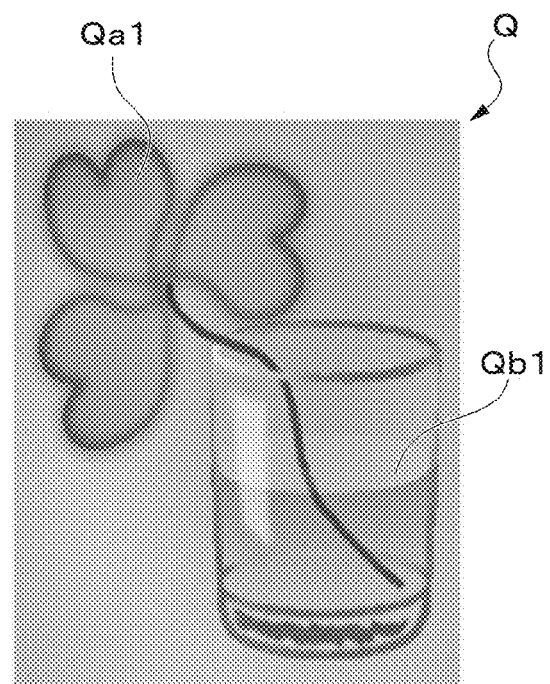
FIG. 10A is a diagram illustrating an example of a display screen in the congestion sign detection device in the modification example and the embodiment of the present invention.

For example, the first interlace screen P illustrated in FIG. 9A and the second interface screen Q illustrated in FIG. 10A are displayed in the case where the absolute value of the spectrum angle is zero or equal to or less than the predetermined value close to zero due to the fact that the acceleration change is zero or less than the predetermined level in such the case where the vehicle is in stop state or in the state of driving at the constant speed. The first interlace screen P illustrated in FIG. 10A includes, for example, an ellipsoid shape Pa1 or the like having a predetermined color which represents the stability (for example, bright green) and a wave shape Pb1 having a low amplitude. In addition, the second interface screen Q illustrated in FIG. 10A includes, for example a clover shape Qa1 or the like having a predetermined color which represents stability (for example, bright green) and a wave shape Qb1 having a low amplitude.

Figure 9B:
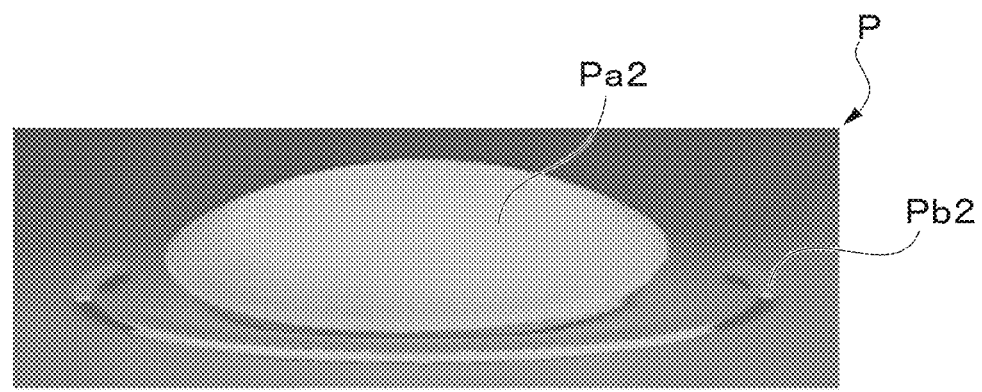
FIG. 9B is a diagram illustrating an example of a display screen in the congestion sign detection device in the modification example and the embodiment of the present invention.
Figure 10B:
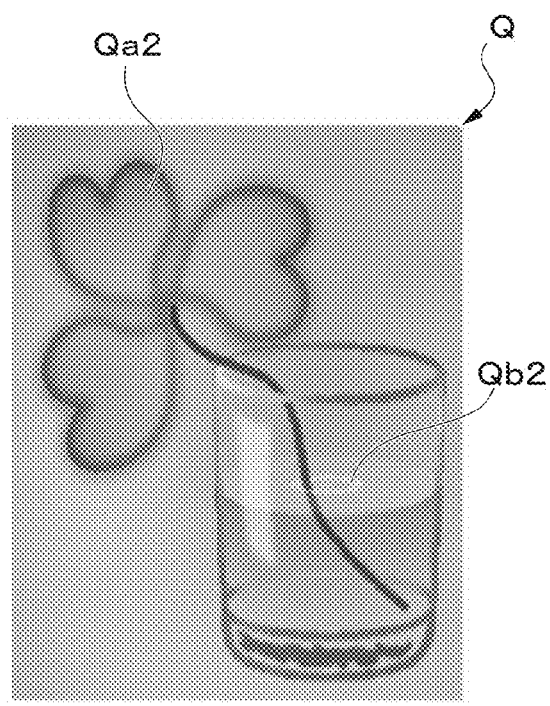
FIG. 10B is a diagram illustrating an example of a display screen in the congestion sign detection device in the modification example and the embodiment of the present invention.

For example, the first interface screen P illustrated in FIG. 9B and the second interface screen Q illustrated in FIG. 10B are displayed in the case where the absolute value of the spectrum angle immediately converges toward zero even if the absolute value of the spectrum angle temporarily increases due to, for example, the vibration at the ordinary driving such as the case where vehicle gently accelerates or decelerates or where the engine brake operates.

The first interface screen P illustrated in FIG. 9B includes, for example, an ellipsoid shape Pa2 or the like having a predetermined color which represents the ordinary state (for example, dark green) and a wave shape Pb2 having a slightly high amplitude. In addition, the second interface screen Q illustrated in FIG. 10B includes, for example, a clover shape Qa2 or the like having a predetermined color which represents the ordinary state (for example, dark green) and a wave shape Qb2 having a slightly high amplitude.

Figure 9C:
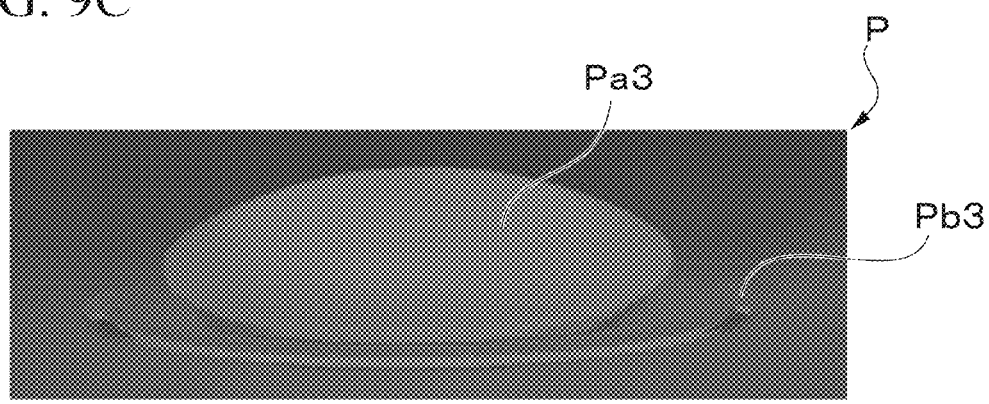
FIG. 9C is a diagram illustrating an example of a display screen in the congestion sign detection device in the modification example and the embodiment of the present invention.
Figure 10C:
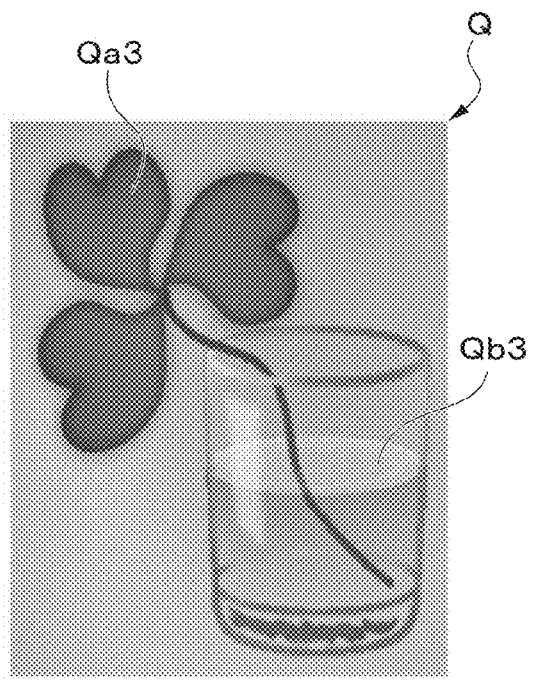
FIG. 10C is a diagram illustrating an example of a display screen in the congestion sign detection device in the modification example and the embodiment of the present invention.
Figure 10D:
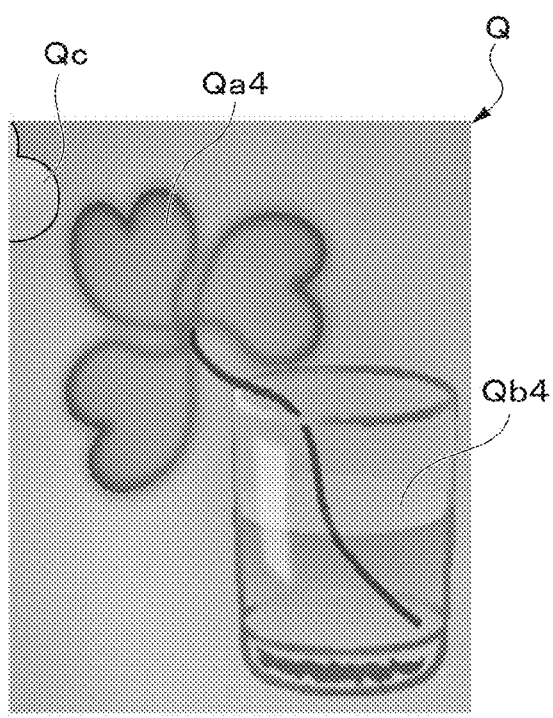
FIG. 10D is a diagram illustrating an example of a display screen in the congestion sign detection device in the modification example and the embodiment of the present invention.

For example, the first interface screen P illustrated in FIG. 9C and the second interlace screen Q illustrated in FIG. 10C are displayed in the case where the absolute value of the spectrum angle becomes large and it takes a long time to converge toward zero due to the fact that the variation of the acceleration is larger than the predetermined variation in such cases of the rapid start, the rapid braking, and the repeated and frequent acceleration and deceleration of the vehicle. The first interface screen P illustrated in FIG. 9C includes, for example, an ellipsoid shape Pa3 or the like having a predetermined color which represents instability (for example, blue) and a wave shape Pb3 having a high amplitude. In addition, the second interface screen Q illustrated in FIG. 10C includes, for example, a clover shape Qa3 or the like having a predetermined color which represents instability (for example, blue) and a wave shape Qb3 having a high amplitude.

Figure 9D:
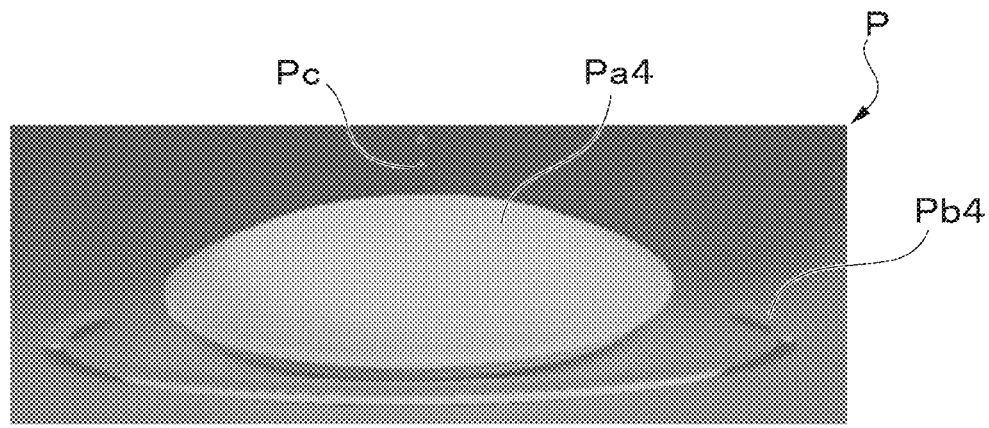
FIG. 9D is a diagram illustrating an example of a display screen in the congestion sign detection device in the modification example and the embodiment of the present invention.

In addition, in the case where the congestion sign detection device 10 is connected to a communication network such as wireless communication network system so as to be appropriately connected to the server device 31 via the communication network without any communication failure, for example, as the first interface screen P illustrated in FIG. 9D and the second interface screen Q illustrated in FIG. 10C, a predetermined communication indicator displays Pc and Qc are displayed.

The congestion sign detection device 10 and the server device 31 of the congestion sign detection system 30 in the embodiment and the modification example described above may be realized by dedicated hardware, or by storing a program for realizing the functions of the congestion sign detection device 10 and the server device 31 in a computer-readable recording medium and causing a computer to read and execute the program stored in the recording medium, the computer may operate as the congestion sign detection device 10 and the server device 31. The computer system described here is assumed to include an OS and hardware such as peripherals. In addition, the computer system is assumed to also include a WWW system which includes a home page providing environment (or a display environment).

In addition, the computer-readable recording medium means a portable medium such as a flexible disk, a magneto-optical disk, ROM, CD-ROM, and the storage device such as a hard disk embedded in the computer system. Furthermore, the computer-readable recording medium is assumed to include a medium that holds the program for a certain time such as a volatile memory (RAM) in the computer system as a server and a client in the case where the program is transmitted via a network such as the internet or a communication line such as a telephone line.

In addition, the program described above may be transmitted to another computer system from the computer system that stores the program in the storage device or the like via a transmission medium or a transmission wave in the transmission medium. Here, the transmission medium that transmits the program means a medium having a function of transmitting information such as the network (communication fretwork) such as the internet or a communication line (communication fine) such as a telephone line.

In addition, the program described above may be a program that can realize part of the functions described above.

Furthermore, the program described above may be a program that can realize the functions described above in combination with the program which is already stored in the computer system, i.e., a differential file (differential program).

The above-described embodiment is presented as an example and is not intended to limit the scope of the invention. The above-described new embodiment can be implemented in various other forms, and various omissions, substitutions, changes can be performed without departing from the spirit of the invention. The embodiment described above and the variations thereof will be included in the range or spirit of the invention and included, in the invention disclosed in the Claims attached hereto and the ranges equivalent thereto. For example, in the example in the embodiment described above, one server device 31 is included in the configuration. However, a plurality of devices may be included in the configuration by connecting through the communication line or the like.

REFERENCE SIGNS LIST

10 congestion sign detection device
12 positioning signal receiver
13 present position acquisition unit (present position information acquisition portion)

14 three-dimensional acceleration sensor (acceleration information acquisition portion)
15 input device
16 display device
17 device control unit
21 input data calculation unit (input data calculation portion)
22 frequency analysis unit (frequency analysis portion)
23 single regression line calculation unit (angle information acquisition portion)
24 determination data calculation unit (congestion sign defection portion)
25 congestion prediction unit (congestion sign detection portion)
30 congestion sign detection system
31 server device
35 range congestion prediction unit

The invention claimed is:

1. A congestion sign detection method that is executed by an electronic device which is movable together with a moving body and includes an acceleration sensor configured to acquire acceleration information of the electronic device in each axis direction of a first axis to a third axis forming an orthogonal coordinate system of the three-dimensional space, the method comprising:
   an input data calculation step of calculating an acceleration vector in the three-dimensional space using the acceleration information acquired by the acceleration sensor, and calculating a norm of a difference of the vectors at two different timings as input data;
   a frequency analysis step of calculating an autocorrelation of the input data and calculating a power spectrum by performing a Fourier transform on the autocorrelation;
   an angle information acquisition step of converting the power spectrum into angle information; and
   a congestion sign detection step of detecting a congestion sign of the moving body according to the angle information.

2. The congestion sign detection method according to claim 1,
   wherein, in the angle information acquisition step, a single regression line at a low frequency region where a frequency of the power spectrum is equal to or lower than a predetermined frequency is calculated, and a slope of the single regression line is converted into the angle information.

3. The congestion sign detection method according to claim 1,
   wherein, in the congestion sign detection step, the congestion sign of the moving body is detected according to a variation of the angle information corresponding to time.

4. A congestion sign detection method that is executed by a congestion sign detection system which includes a server device, and an electronic device that is movable together with a moving body and includes an acceleration sensor configured to acquire acceleration information of the electronic device in each axis direction of a first axis to a third axis forming an orthogonal coordinate system of the three-dimensional space and a positioning signal receiver configured to acquire present position information of the electronic device, the method comprising:
   an input data calculation step of causing the electronic device to calculate an acceleration vector in the three-dimensional space using the acceleration information acquired by the acceleration sensor, and to calculate a norm of a difference of the vectors at two different timings as input data;
   a frequency analysis step of causing the electronic device to calculate an autocorrelation of the input data and calculating a power spectrum by performing a Fourier transform on the autocorrelation;
   an angle information acquisition step of causing the electronic device to convert the power spectrum into angle information;
   an electronic device information transmission step of causing the electronic device to transmit the angle information and the present position information acquired by the positioning signal receiver to the server device;
   a position range congestion sign detection step of causing the server device to detect a congestion sign of the moving body within a position range by the number and proportion of the electronic devices in which an absolute value of the angle within the appropriate position range becomes equal to or greater than a predetermined value using the present position information and the angle information received from at least one or more electronic devices; and
   a server information transmission step of causing the server device to transmit information of the congestion sign of the moving body within the position range to the electronic device in the position range.

5. A non-transitory computer-readable storage medium storing a program for causing a computer configuring an electronic device, which is movable together with a moving body and includes an acceleration sensor configured to acquire acceleration information of the electronic device in each axis direction of a first axis to a third axis forming an orthogonal coordinate system of the three-dimensional space, to function as:
   an input data calculation portion configured to calculate an acceleration vector in the three-dimensional space using the acceleration information acquired by the acceleration sensor, and calculate a norm of a difference of the vectors at two different timings as input data;
   a frequency analysis portion configured to calculate an autocorrelation of the input data calculated by the input data calculation portion, and calculating a power spectrum by performing a Fourier transform on the autocorrelation;
   an angle information acquisition portion configured to convert the power spectrum calculated by the frequency analysis portion into angle information; and
   a congestion sign detection portion configured to detect a congestion sign of the moving body according to the angle information acquired by the angle information acquisition portion.

6. The non-transitory computer-readable storage medium according to claim 5,
   wherein the angle information acquisition portion calculates a single regression line at a low frequency region where a frequency of the power spectrum is equal to or lower than a predetermined frequency, and converts a slope of the single regression line into the angle information.

7. The non-transitory computer-readable storage medium according to claim 5,
   wherein the congestion sign detection portion detects the congestion sign of the moving body according to a variation of the angle information corresponding to time.

8. A congestion sign detection device which is movable together with a moving body, the device comprising:

an acceleration sensor configured to acquire acceleration information of the congestion sign detection device in each axis direction of a first axis to a third axis forming an orthogonal coordinate system of the three-dimensional space; and a processor, wherein the processor is functioned as:

an input data calculation portion configured to calculate an acceleration vector in the three-dimensional space using the acceleration information acquired by the acceleration sensor, and calculating a norm of a difference of the vectors at two different timings as input data;

a frequency analysis portion configured to calculate an autocorrelation of the input data calculated by the input data calculation portion, and calculating a power spectrum by performing a Fourier transform on the autocorrelation;

an angle information acquisition portion configured to convert the power spectrum calculated by the frequency analysis portion into angle information; and a congestion sign detection portion configured to detect a congestion sign of the moving body according to the angle information acquired by the angle information acquisition portion.

9. The congestion sign detection device according to claim 8, wherein the angle information acquisition portion calculates a single regression line at a low frequency region where a frequency of the power spectrum is equal to or lower than a predetermined frequency, and converts a slope of the single regression line into the angle information.

10. The congestion sign detection device according to claim 8, wherein the congestion sign detection portion detects the congestion sign of the moving body according to a variation of the angle information corresponding to time.

\* \* \* \* \*